United States Patent [19]
Greene

[11] 3,955,195
[45] May 4, 1976

[54] FIXED BEAM RADAR WITH DUAL RANGE LIGHT DISPLAY PROVIDING BOTH RANGE AND AZIMUTH INFORMATION

[75] Inventor: Leonard M. Greene, Chappaqua, N.Y.

[73] Assignee: Safe Flight Instrument Corporation, White Plains, N.Y.

[22] Filed: Oct. 23, 1974

[21] Appl. No.: 517,164

Related U.S. Application Data
[63] Continuation-in-part of Ser. No. 471,349, May 17, 1974.

[52] U.S. Cl. .......................... 343/13 R; 343/12 SB; 343/16 LS
[51] Int. Cl.² .......................... G01S 7/04; G01S 9/04
[58] Field of Search............ 343/12 SB, 13 R, 16 LS

[56] References Cited
UNITED STATES PATENTS

| | | | |
|---|---|---|---|
| 2,939,135 | 5/1960 | Beckerich et al. | 343/16 LS |
| 3,035,262 | 5/1962 | Vantine, Jr. | 343/13 X |
| 3,087,151 | 4/1963 | Vantine, Jr. | 343/13 R X |
| 3,173,137 | 3/1965 | Byrne | 343/6.5 R |
| 3,229,245 | 1/1966 | Hurdle et al. | 343/13 R X |
| 3,274,592 | 9/1966 | Crane | 343/16 LS X |
| 3,725,937 | 4/1973 | Schreiber | 343/16 LS X |
| 3,849,779 | 11/1974 | Boyd | 343/16 LS X |

Primary Examiner—Malcolm F. Hubler
Attorney, Agent, or Firm—Edward A. Sokolski

[57] ABSTRACT

A radar principally for use on small vehicles such as sailboats, utilizing a fixed antenna which provides a continuous forward looking beam and has a dual range display providing range and limited azimuth information. Separate antenna elements are utilized to receive echoes in the paths of left and right radar beams respectively, these left and right beams being slightly to the left and right of the boresight of the radar antenna. Utilizing digital techniques, the video representing radar echoes received in the left and right beams is gated in proper time sequence corresponding to target range, to a series of indicator lights for left and right range display respectively. These indicator lights each represent a different target range and are excited in accordance with video signals received in the left and right beams respectively. The indicator lights vary in their intensity so as to indicate whether targets are to the left or right of the antenna boresight and thus to the left or right of the heading of the vehicle. The indicator lights thus indicate both the range and relative azimuth of targets ahead of the boat.

9 Claims, 8 Drawing Figures

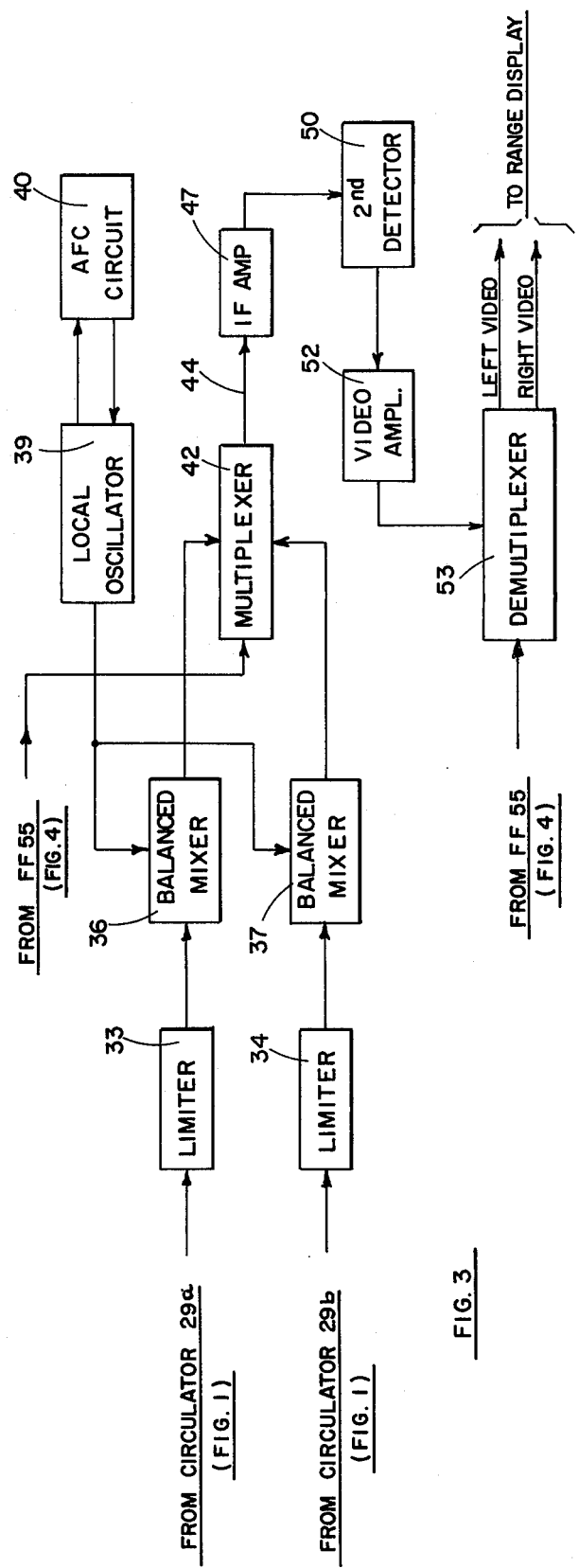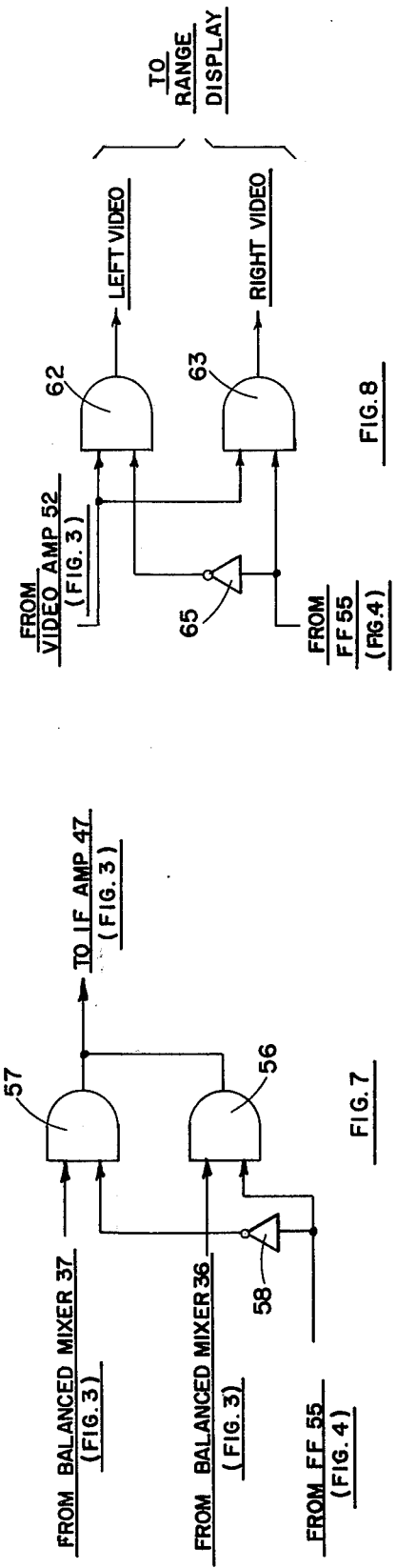

FIXED BEAM RADAR WITH DUAL RANGE LIGHT DISPLAY PROVIDING BOTH RANGE AND AZIMUTH INFORMATION

This application is a continuation in part of my application Ser. No. 471,349, filed May 17, 1974.

This invention relates to radar equipment, and more particularly to such equipment utilizing fixed dual antenna receive beams and providing a dual light display indicating target range and relative target azimuth.

In my application Ser. No. 471,349, of which the present application is a continuation in part, a radar equipment is described for use on small vehicles such as sailboats, which has low power drain, is light and compact in construction, and has a relatively low cost. This equipment utilizes a fixed antenna which provides a forward looking beam and has a simple range display formed by an indicator lamp bank viewable in broad daylight which provides target range information.

The present invention is an improvement over the equipment described in my aforementioned patent application, in that it is capable of providing limited azimuth information on the targets as well as range information. The equipment of the present invention utilizes the same basic approach as that of my aforementioned application, employing a fixed antenna and a bank of lights for indicating the range of targets forward of the vehicle. However, rather than utilizing a single set of display lamps, one for each target range, a dual set of range lamps is provided, one such set operating in conjunction with an antenna "left" receive beam, the other such set of lamps operating in conjunction with an antenna "right" receive beam. For a target to the left of the antenna boresight, the "left" lamp for the range of that particular target will glow brighter than the "right" lamp for that particular range. Thus, the operator can determine whether targets are to the left or right of vehicle heading.

It is therefore an object of this invention to provide a simple economical lightweight radar equipment suitable for use on vehicles such as sailboats, which provides target range and limited azimuth information as well.

It is a further object of this invention to provide a simple lightweight radar which provides a dual range display comprising a pair of lamp banks representing echoes in "left" and "right" receive beams.

Other objects of this invention will become apparent as the description proceeds in connection with the accompanying drawings, of which:

FIG. 3 is a functional schematic drawing illustrating the receiver of the preferred embodiment;

FIG. 7 is a schematic drawing indicating a multiplexer which may be utilized in the preferred embodiment; and FIG. 8 is a schematic drawing showing a demultiplexer which may be utilized in the preferred embodiment.

Briefly described, the preferred embodiment of the invention comprises a fixed radar antenna which radiates a conical beam in the direction in which a sailboat or other vehicle on which the equipment is installed is traveling. This transmit beam is synthesized from radar energy supplied from a pair of waveguide feeds positioned on opposite sides of the boresight of a parabolic reflector. Clock circuits are utilized to generate trigger pulses for triggering the transmitter, the output of the transmitter being equally split with half of the power being fed to each of the waveguides from which the aforementioned feeds emanate. Echoes received from the targets by the antenna enter the two waveguides with an energy level which is in accordance with the position of the targets relative to the antenna boresight. Thus, echoes representing targets to the left of the boresight will have a greater energy level in the waveguide whose feed is positioned to the left of the boresight, while targets to the right of the boresight will produce greater intensity echoes in the "right" waveguide. The signals received in the "left" and "right" waveguides are fed to a receiver where they are multiplexed together for amplification and detection, and then demultiplexed to provide video signals representing the "left" and "right" received signals. These left and right video signals are displayed on "left" and "right" banks of indicator lamps respectively. This dual range display may be formed by a bank of light emitting diodes, incandescent lamps, or gas discharge lamps, there being a lamp in each bank for each target range. A separate gate is provided for each of the lamps in the light display banks. The radar video signals for the left and right displays are fed in parallel to all of the gates for the associated display respectively. Counter and decoder circuits which are synchronized with a clock circuit utilized to generate the transmitter trigger pulses provide sequential gating signals, each gating signal representing a different target range, these signals being utilized to actuate the aforementioned gates. Thus, the indicator lamps are actuated to indicate the ranges of targets within the beam of the radar with the "left" and "right" banks providing information as to whether the targets are to the left or right of the antenna boresight.

Figure 1:
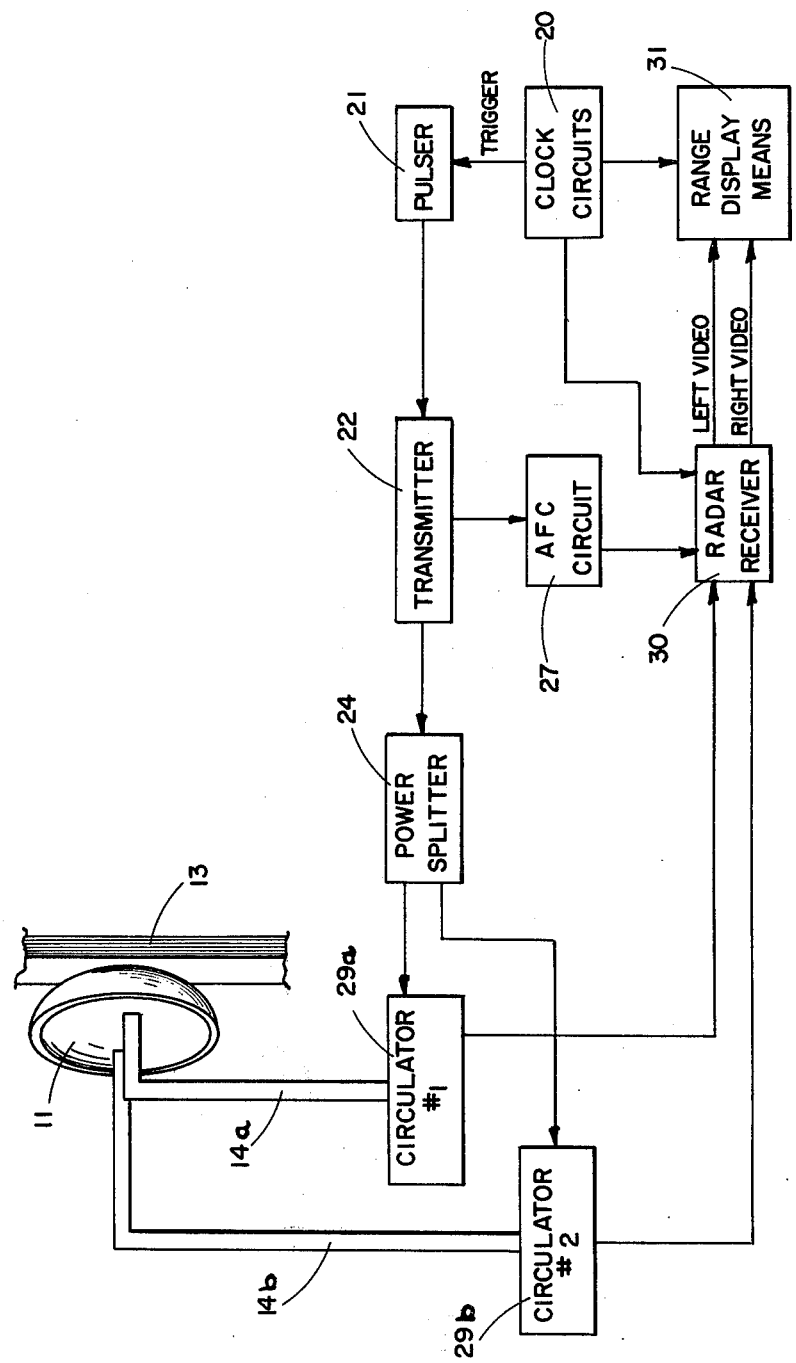
FIG. 1 is a functional block diagram of a preferred embodiment of the invention.
Figure 2:
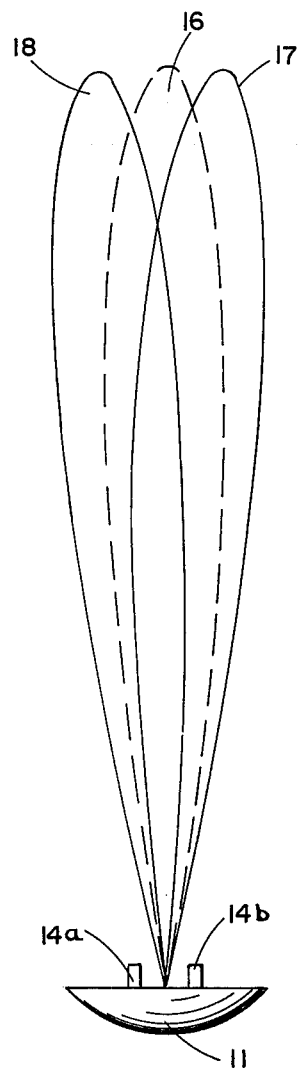
FIG. 2 is a schematic drawing indicating the transmit and receive beams of the preferred embodiment.

Referring now to FIG. 1, a preferred embodiment of the system of the invention is schematically illustrated. Radar antenna 11 which may be of the parabolic reflector type is fixedly mounted on boat mast 13. Radio frequency energy is fed to the antenna by means of waveguides 14a and 14b. The antenna radiates a fixed conical beam which, as shown in FIG. 2, effectively has a single lobe 16 which is synthesized from the dual waveguide outputs, FIG. 2 being a view taken from above the antenna and showing the horizontal radiation pattern.

Clock circuits 20 generate trigger pulses which trigger pulser 21. Pulser 21 which may comprise a one-shot multi-vibrator generates pulses, which typically may have a three microsecond duration, in response to each trigger pulse received thereby. Pulser 21 operates to drive radar transmitter 22, causing the transmitter to have a pulsed output in accordance with the drive signal received from the pulser. The output of transmitter 22 which may comprise a conventional radar transmitter may use a power oscillator formed by a semiconductor Impatt diode operating at a frequency in the neighborhood of 9.5 GHz. The transmitter also may include a 20 db coupler which extracts a small amount of the RF power for use in the receiver AFC circuits 27. The power output of transmitter 22 is fed to power splitter 24, where it is split equally, half of the power being fed to circulator No. 1, 29a, and the other half of the power being fed to circulator No. 2, 29b. Power is fed to the antenna from circulators 29a and 29b by means of waveguides 14a and 14b respectively. As already noted, wave-guide feeds emanating from waveguides 14a and 14b are positioned on either side of the focal point of the parabolic antenna reflector, the paraboloid collimating the energy from both feeds to form a single conical beam 16, as shown in FIG. 2.

On reception, energy reflected from an object is collected by the paraboloid and directed towards the focal point thereof. Since the waveguide feeds are displaced horizontally on either side of such focal point, two reception beams 17 and 18 are formed (see FIG. 2). It is to be noted that the energy received in each beam is the function of the angular distance of an object from the antenna boresight. Thus, targets to the left of such boresight will provide greater energy in beam 18 than beam 17, while targets to the right of the boresight will provide greater energy in beam 17 than beam 18. The utilization of dual antenna lobes in providing azimuth information on targets is well known in the art and is described for example in Section 39, starting on Page 209, of RADAR SYSTEM FUNDAMENTALS (TM 11-467), published by the U.S. Government Printing Office. It is to be noted that a lobe switch arrangement such as described in this publication could be used in implementing the present invention.

RF energy received in antenna feeds 14a and 14b is passed through circulators 29a and 29b respectively to radar receiver 30 where, as to be explained further on in the specification, the energy for the two channels is multiplexed together for amplification and detection and then in video form, demultiplexed to provide "left" and "right" video signals in accordance with the energy received in wave guides 14a and 14b respectively. The left and right video signals are fed to range display means 31 where, as also to be explained further on in the specification, the signals are used to drive indicator lamps corresponding to target ranges for the left and right received signals.

Referring now to FIG. 3, a receiver which may be utilized in the preferred embodiment is schematically illustrated. The received echoes for the "left" and "right" waveguides are fed from circulators 29a and 29b to limiters 33 and 34 respectively. Limiters 33 and 34 which may comprise microwave PIN diodes are used to prevent excessive RF power from demaging the mixers, such excessive power possibly being radiated from a nearby radar operating on the same frequency or resulting from leakage of transmitter power through the circulator in the direction of the mixer. The received RF energy is fed from limiters 33 and 34 to balanced mixers 36 and 37 respectively. The balanced mixers are used to convert the signals to the IF frequency which may be on the order of 60 megaHertz. The mixers receive a local oscillator signal from local oscillator 39, the frequency of which is maintained by means of AFC circuit 40. The mixer, local oscillator and AFC circuits may be of conventional types well known in the art, the AFC circuit, as already described, operating in response to low level signals taken from the transmitter.

Figure 6:
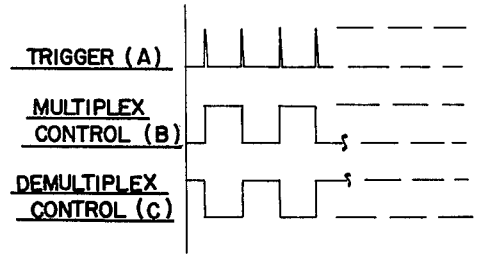
FIG. 6 is a timing diagram indicating various pulses generated in the circuitry illustrated in FIG. 4.

The outputs of balanced mixers 36 and 37 are fed to multiplexer 42, which time multiplexes the signal and alternately provides the signal outputs of each of the mixers on line 44 which feeds these signals to IF amplifier 47. The multiplexer, as to be described further on in the specification in connection with FIG. 7, operates in response to an output of flipflop 55 (FIG. 4), this flipflop output being shown in line B of FIG. 6. As can be seen in FIG. 6, the flipflop control signal fed to the multiplexer changes state in response to each succeeding transmitter trigger pulse (shown in line A of FIG. 6). Thus, the multiplexer operates to alternately gate one and then the other of the balanced mixer outputs through IF amplifier 47 after each transmitter trigger pulse arrives. It is to be noted that while the preferred embodiment shows alternate gating of the left and right signals, these signals need only be gated in the alternative and several "left" beam echoes can be followed by several "right" beam echoes, etc.

The output of IF amplifier 47 is detected by means of second detector 50 which provides the detected video envelope to video amplifier 52. The signals are amplified by means of video amplifier 52 and fed to demultiplexer 53 which operates in response to flipflop 55 (FIG. 4) to separate the "left" and "right" video signals from each other (operation to be described in connection with FIG. 8). The left and right video signals are fed from demultiplexer 53 to range display means 31 and are utilized to provide target indications as to be explained in connection with FIG. 4.

Referring now to FIG. 7, a multiplexer circuit which may be utilized in the receiver described in connection with FIG. 3 is schematically illustrated. The output signals from balanced mixers 36 and 37 (FIG. 3), are fed to AND gates 56 and 57 respectively. Gate 56 receives a gating signal from flipflop 55 (FIG. 4), this gating signal being illustrated on line B of FIG. 6. Gate 57 receives a gating signal inverted with respect to that received by gate 56, such inversion being accomplished by inverting amplifier 58. As can be seen by reference to FIG. 6, the gating signal from flipflop 55 is a rectangular wave pulse, the leading edge of which coincides with the transmitter trigger pulse (shown on Line A of FIG. 6) and the trailing edge of which coincides with the next succeeding such trigger pulse. Thus it should be apparent that the gating signals to AND gates 56 and 57 will alternately gate signals through these gates in succession such that for successive transmitter pulses first signals from the "left" wave guide will be fed to the IF amplifier, and then signals from the "right" wave guide.

Referring now to FIG. 8, a demultiplexer circuit which may be utilized in the preferred embodiment of the receiver is schematically illustrated. This demultiplexer utilizes a pair of AND gates 62 and 63. The output of video amplifier 52 (FIG. 3) is fed to both of the AND gates. A gating signal for AND gate 63 is provided from line C of flipflop 55 (FIG. 4), this signal being illustrated in FIG. 6 (line C). This gating signal from flipflop 55 is inverted by means of inverting amplifier 65 and fed as a gating signal to AND gate 62. It should be apparent that gates 62 and 63 will be alternately gated to pass the video signals therethrough, this gating action occurring in synchronism with the transmitter trigger such as to demultiplex the left and right video signals for use in the range display.

Figure 4:
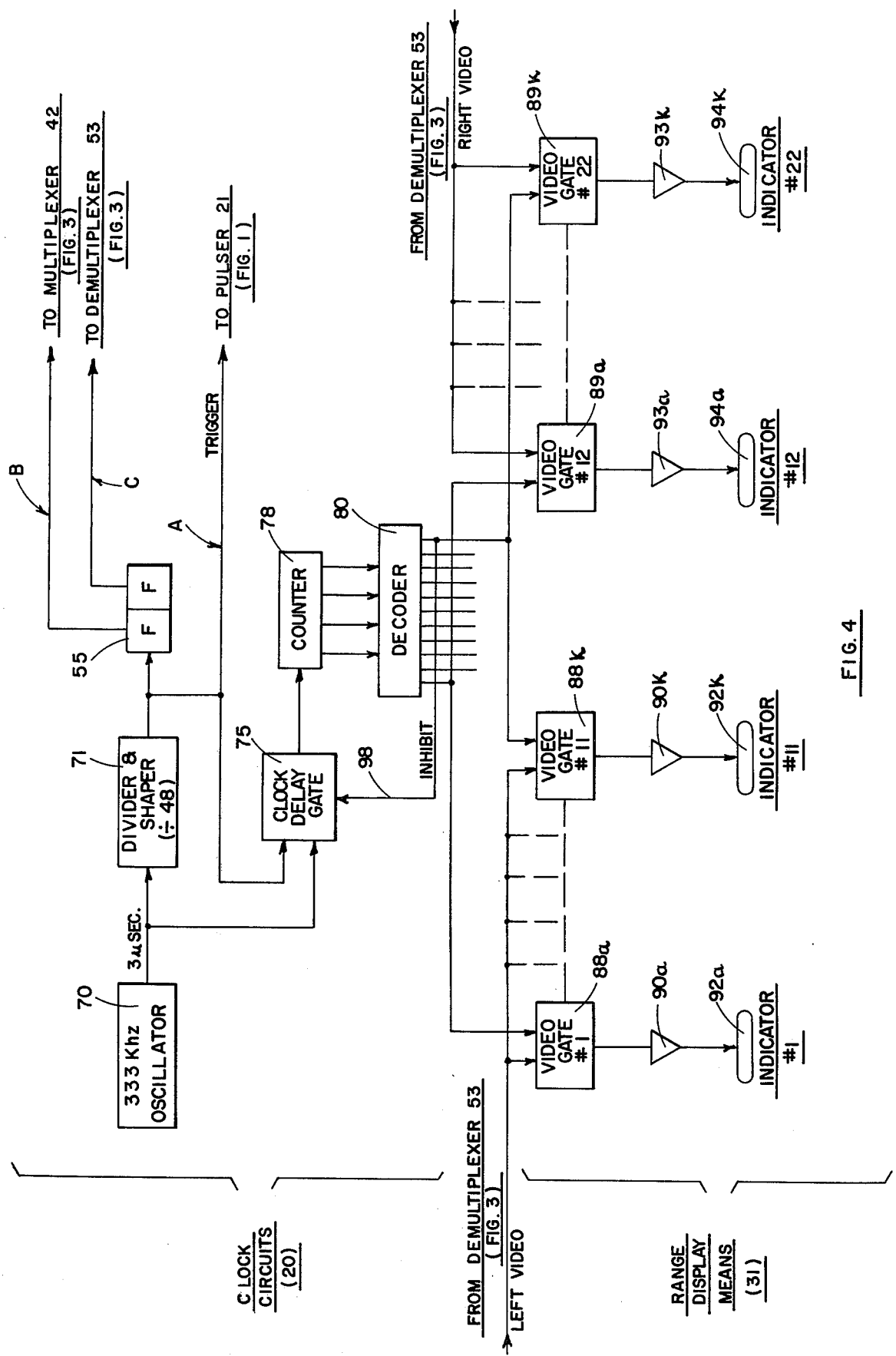
FIG. 4 is a functional block diagram indicating the clock and range display circuits of the preferred embodiment.

Referring now to FIG. 4, preferred embodiments of the clock circuits and range display circuits of the invention are schematically illustrated. Master clock pulses are generated by 333 kiloHertz oscillator 70, these pulses appearing at 3 microsecond intervals. The pulse output of oscillator 70 is divided by 48 and shaped to form sharp trigger pulses by means of divider and shaper 71. The pulse output of divider and shaper 71 is illustrated in line A of FIG. 6, and is used as a trigger pulse for driving the transmitter pulser 21 of FIG. 1. These pulses are also utilized to drive flipflop 55 to provide successive outputs on lines B and C, as illustrated in FIG. 6. The outputs of flipflop 55, as already explained, are utilized to synchronize the operation of multiplexer 42 and demultiplexer 53.

The trigger pulses are also fed to clock delay gate 75, this gate also receiving the pulse output of oscillator 70. Clock delay gate 75 is placed in the ON state with the arrival of each trigger pulse on line A, and returned to the OFF state by an inhibit signal arriving on line 98 from decoder 80. With this gate in the ON state, each pulse arriving from oscillator 70 is passed to a delay circuit incorporated in the clock delay gate. This delay circuit delays the clock pulses so as to compensate for delays in the system components and insures that the video gates will be gated ON at the proper times to provide a proper target range readout by the indicators. The delay circuit may, for example, comprise a multivibrator, the output of which has a pulse width which corresponds to the required delay. This output is differentiated and the differentiation of the trailing edge of the multivibrator output utilized as the delayed clock pulse fed to counter 78.

The pulse output of delay gate 75 is counted in binary counter 78, the binary coded output of four bit counter 78 being fed to four line-eleven line decoder 80. Decoder 80 has a series of sequential outputs spaced from each other by a time interval such as to provide proper gating signals for each of the video gates 88a–88k, and 89a–89k, in succession. The video gates 88a–88k receive the "left" video signals, while the gates 89a–89k receive the "right" video signals. The left and right signals, as already noted, appear sequentially, the left signals appearing after every other radar trigger, and the right signals appearing between the left signals. The output of each of gates 88a–88k is fed through an associated low pass filter and amplifier 90a–90k to an associated indicator lamp 92a–92k. Similarly, the outputs of gates 89a–89k are fed through low pass filters and amplifiers 93a–93k to indicators 94a–94k respectively. Thus, whenever a video signal is present at the time when any of the video gates is being gated, this video signal will be passed on to an associated one of the lamps to actuate the lamp. Lamps 92a–92k, 94a–94k, may comprise light emitting diodes, incandescent or gas discharge lamps.

Figure 5:
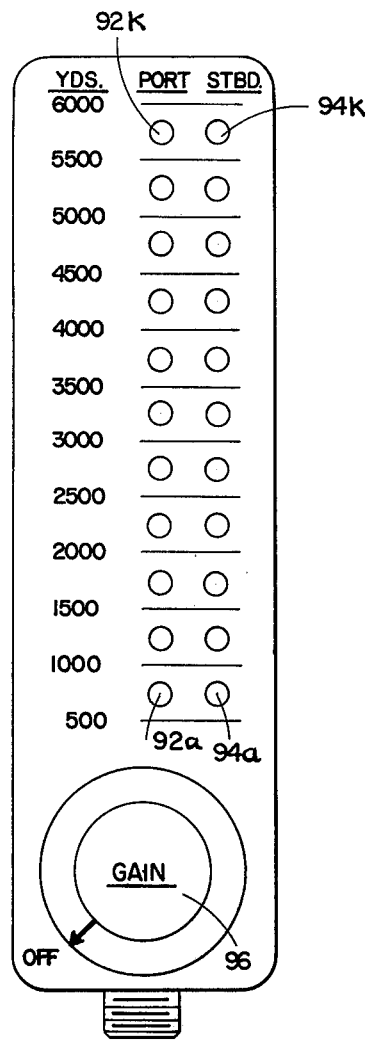
FIG. 5 is a pictorial view illustrating a control unit which may be utilized in the preferred embodiment of the invention.

Referring now additionally to FIG. 5, an indicator display of the preferred embodiment is pictorially illustrated. As can be seen, the lamps 92a–92k represent targets at various ranges as received in the left (port) waveguide, while lamps 94a–94k represent various target ranges for signals received in the right (starboard) waveguide. The intensity of illumination of the lamps indicate for a target at any given range whether this target is to the right or the left of the antenna boresight and thus to the right or left of the heading of the vessel. Thus, for example, with a target at 500 yards, if lamps 92a and 94a glow with equal brilliance, such target is dead ahead. On the other hand, if lamp 92a glows with greater brilliance than lamp 94a, this would indicate that the target is to the port of vessel heading. Gain control 96 is used to adjust the video gain for proper operation.

Referring again to FIG. 4, the inhibit signal fed from decoder 80 to clock delay gate 75 on line 98 operates to inhibit the operation of the delay gate when the decoder reaches its last output (that for video gates 88k and 89k). This inhibit signal disappears when the next trigger signal arrives on line A, and the cycle is then repeated.

The radar system of this invention thus provides a simple forward looking radar which not only provides range information but also indications as to whether the targets are to the left or right of the vessel's heading.

While the invention has been described and illustrated in detail, it is to be clearly understood that this is intended by way of illustration and example only and is not to be taken by way of limitation, the spirit and scope of the invention being limited only by the terms of the following claims.

I claim:

1. In a radar system having transmitter means for generating pulses of radio frequency energy, antenna means for radiating a beam of said energy and for receiving echoes from objects in the path of the radiated beam in a pair of lobes to the left and right of the antenna boresight, and means for converting the received echoes to video signals, the improvement comprising:
   first and second banks of range indicator devices for providing a display in accordance with the signals received in the left and right beams respectively, each of the indicator devices of said first bank having a paired indicator device in the second bank representing the same range thereas,
   a clock generator for generating master clock pulses,
   means for dividing the frequency of said clock pulses to provide trigger pulses for the transmitter,
   digital counter means for providing an output count in response to said clock pulses, the count of said counter means being initiated in response to said trigger pulses,
   decoder means responsive to the output of said counter means for producing a sequence of pulses which are time related to the trigger pulses so as to each represent a predetermined radar range, first and second groups of gating means for the range indicator devices in the first and second groups thereof respectively, the gating means in said first and second groups receiving the video signals representing signals received in said left and right beams respectively and each being gated in response to a separate one of the decoder means pulses, and
   means for coupling a signal in accordance with the output of each of said gating means to an associated one of said indicator devices.

2. The system of claim 1 wherein the means for converting the received echoes includes means for time multiplexing the signals received in said left and right beams, said left and right beam signals appearing in the output of said multiplexing means in the alternative in response to succeeding transmitter trigger pulses, amplifier means for amplifying the output of the multiplexing means and means for demultiplexing the output of the amplifier means to provide separate video signals for the left and right beams, said signals being fed to the first and second banks of indicator devices respectively.

3. The system of claim 1 wherein said indicator devices are indicator lamps, the relative intensities of each of the paired lamps indicating whether the target represented thereby is to the left or right of the antenna boresight.

4. The system of claim 1 wherein said indicator devices are light emitting diodes, the relative intensities of each of the paired diodes indicating whether the target represented thereby is to the left or right of the antenna boresight.

5. The system of claim 1 wherein said means for coupling a signal to an associated one of said indicator devices comprises an amplifier interposed between each of the gating means and its associated indicator device.

6. A radar system comprising:
a radar transmitter for transmitting pulses of radio frequency energy,
a fixed antenna for radiating the output of said transmitter,
means for splitting the power output of said transmitter into two parts,
means for separately feeding each of said parts of power to said antenna to cause said antenna to have a single "transmit" beam and a pair of "receive" beams the centerlines of which are to the left and right of the antenna boresight respectively,
a receiver coupled to said antenna for receiving radio frequency echoes from objects in the path of said "transmit" beam,
display means connected to receive the output of said receiver for providing a display indicating the range of said targets and the azimuth thereof relative to the antenna boresight, said display means comprising first and second banks of indicator devices, there being one of said indicator device on each of said banks for representing each of a plurality of predetermined different brackets of ranges, and
clock circuit means for generating trigger pulses for pulsing the transmitter and for generating synchronizing pulses for actuating each of said indicator devices during a time period corresponding to its respective range bracket, said clock circuit means including a clock generator for generating master clock pulses, divider means for dividing the frequency of said clock pulses to produce said trigger pulses, counter circuit means for counting the clock pulses, the count of said counter circuit means being initiated by said trigger pulses, and decoder circuit means responsive to the output of said counter circuit means for generating said synchronizing pulses for sequentially actuating the indicator devices in each of the banks thereof.

7. The system of claim 6 wherein the means for separately feeding each of said parts of power to said antenna comprises a pair of waveguides having power feeds positioned to the left and right of the boresight of the antenna respectively.

8. The system of claim 6 wherein said indicator devices are lamps, the relative intensities of illumination of the corresponding lamps on each of said banks indicating whether the target represented thereby is to the left or right of the antenna boresight.

9. The system of claim 6 wherein said receiver includes means for time multiplexing signals in the left and right "receive" beams, means for amplifying and detecting said multiplexed signals and means for demultiplexing the detected signals to provide separate "left" and "right" video outputs to said display means.

* * * * *